(12) United States Patent
Iijima

(10) Patent No.: US 6,898,514 B2
(45) Date of Patent: May 24, 2005

(54) STOLEN VEHICLE TRACKING SYSTEM AND STOLEN VEHICLE TRACKING METHOD

(75) Inventor: Youichi Iijima, Hadano (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 0 days.

(21) Appl. No.: 10/612,912

(22) Filed: Jul. 7, 2003

(65) Prior Publication Data

US 2004/0010370 A1 Jan. 15, 2004

(30) Foreign Application Priority Data

Jul. 12, 2002 (JP) .................................. P 2002-204330

(51) Int. Cl.[7] ............................ B60R 25/10; G08B 5/22
(52) U.S. Cl. ................. 701/200; 701/214; 342/357.07; 340/426.19; 340/825.36; 340/825.49
(58) Field of Search .................. 340/825.36, 988–989, 340/991–993, 426.1, 426.11, 426.12, 426.13, 426.15, 426.16, 426.19, 426.2, 426.22, 539.1, 539.21, 539.22, 539.32, 540–541, 568.1, 571, 825.49; 701/207, 209, 213–214; 342/357.01, 357.06, 357.07, 357.09, 357.17, 457

(56) References Cited

U.S. PATENT DOCUMENTS

| 4,742,357 A | * | 5/1988 | Rackley ...................... 342/457 |
| 5,223,844 A | * | 6/1993 | Mansell et al. ......... 342/357.07 |
| 5,497,149 A | * | 3/1996 | Fast ........................... 340/988 |
| 6,163,695 A | * | 12/2000 | Takemura ................ 455/456.4 |
| 6,608,553 B2 | * | 8/2003 | Isobe ...................... 340/426.1 |
| 2003/0034915 A1 | * | 2/2003 | Sasaki et al. .......... 342/357.07 |
| 2003/0151500 A1 | * | 8/2003 | Mitsui ..................... 340/426.1 |

FOREIGN PATENT DOCUMENTS

| JP | 8-136639 | | 5/1996 | |
| JP | 8-301107 | | 11/1996 | |
| JP | 2001180444 A | * | 7/2001 | ........... B60R/25/10 |
| JP | 2001184581 A | * | 7/2001 | ........... G08B/25/10 |

* cited by examiner

*Primary Examiner*—Jacques H. Louis-Jacques
(74) *Attorney, Agent, or Firm*—McDermott Will & Emery LLP

(57) ABSTRACT

A stolen vehicle tracking apparatus has a communication enable area discriminating and processing section discriminating whether communication is available between an own vehicle and a service center, and a control section which controls so as to interrupt given information from being transmitted when discriminated by the communication enable area discriminating and processing section that no availability of communication is established.

7 Claims, 3 Drawing Sheets

STOLEN VEHICLE TRACKING SYSTEM AND STOLEN VEHICLE TRACKING METHOD

BACKGROUND OF THE INVENTION

The present invention relates to a stolen vehicle tracking apparatus and a stolen vehicle tracking method that control an on-vehicle transmitting means for transmitting given information to a base station in occurrence of an own vehicle being stolen.

Stolen vehicle tracking apparatuses are known from Japanese Patent Applications Laid-Open No. 8-136639 and No. 8-3011073 wherein an on-vehicle transmitting means is controlled so as to transmit theft information indicative of consequence of a theft and own vehicle positional information to a base station in occurrence of an own vehicle being stolen.

SUMMARY OF THE INVENTION

However, attempts have been made to render the on-vehicle transmitting means operative to allow given information to be continuously transmitted in occurrence of the own vehicle being stolen. For this reason, an issue is encountered in that an electric power consumption increases.

The present invention has been completed to address such a related art issue and has a stolen vehicle tracking apparatus that is able to eliminate the electric power consumption.

To achieve the above object, a stolen vehicle tracking apparatus according to the present invention comprises an on-vehicle transmitting section transmitting given information to a base station in occurrence of an own vehicle being stolen, a communication enable area discriminating and processing section discriminating to find whether communication is available between the own vehicle and the base station, and a control section controlling the on-vehicle transmitting section so as to interrupt the given information from being transmitted when discriminated by the communication enable area discriminating and processing section that the own vehicle stands outside of a communication area.

Further, a method of, the present invention, for tracking a stolen vehicle in occurrence of an own vehicle being stolen, which comprises transmitting given information to a base station in occurrence of an own vehicle being stolen, discriminating whether communication is available between an own vehicle and a base station, and interrupting the given information from being transmitted when discriminated that the own vehicle stands outside of a communication area.

DETAILED DESCRIPTION OF THE PREFERRED EMBODIMENS (First Embodiment)

Figure 1:
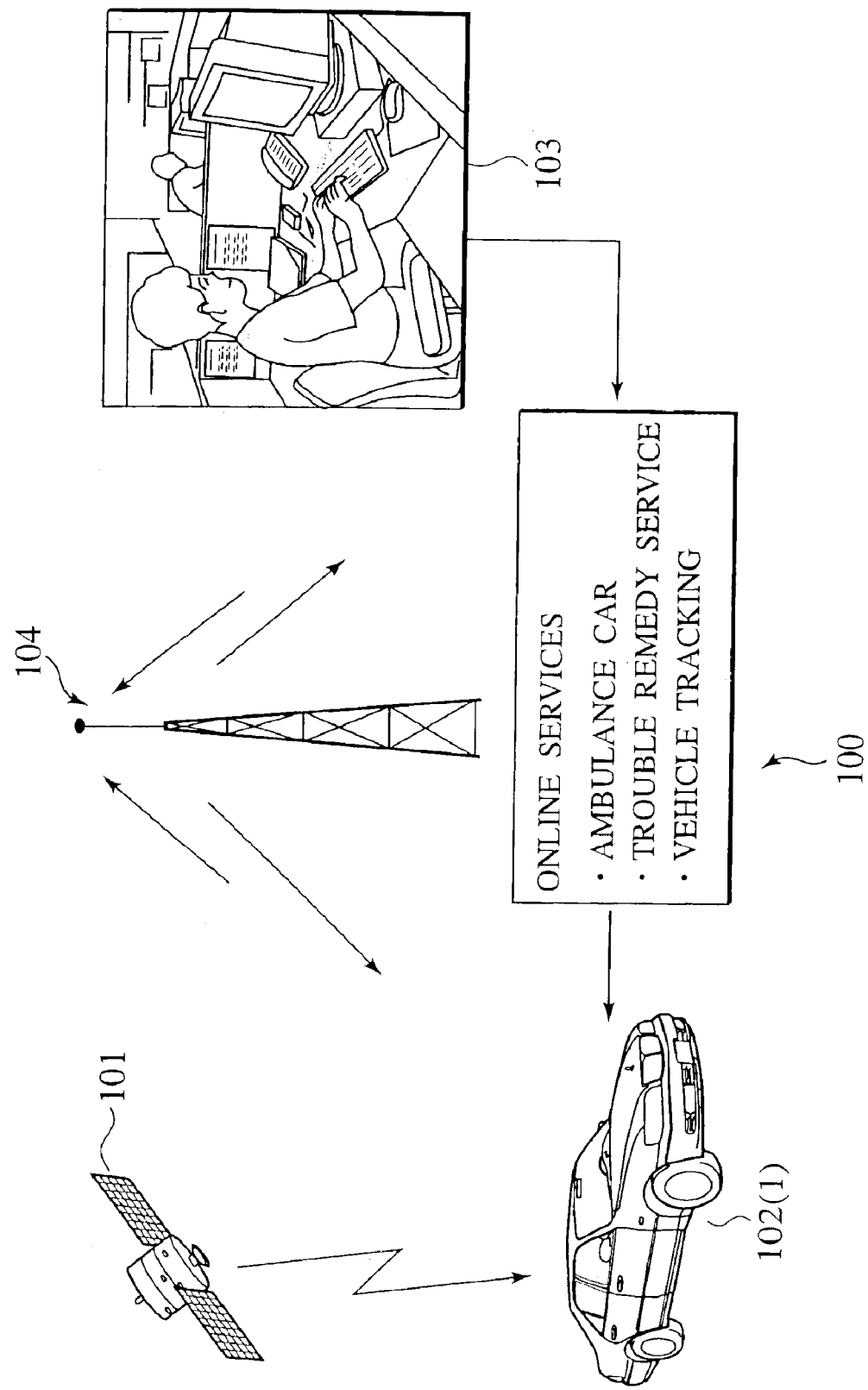
FIG. 1 is a view illustrating a structure of a stolen vehicle tracking system.
Figure 2:
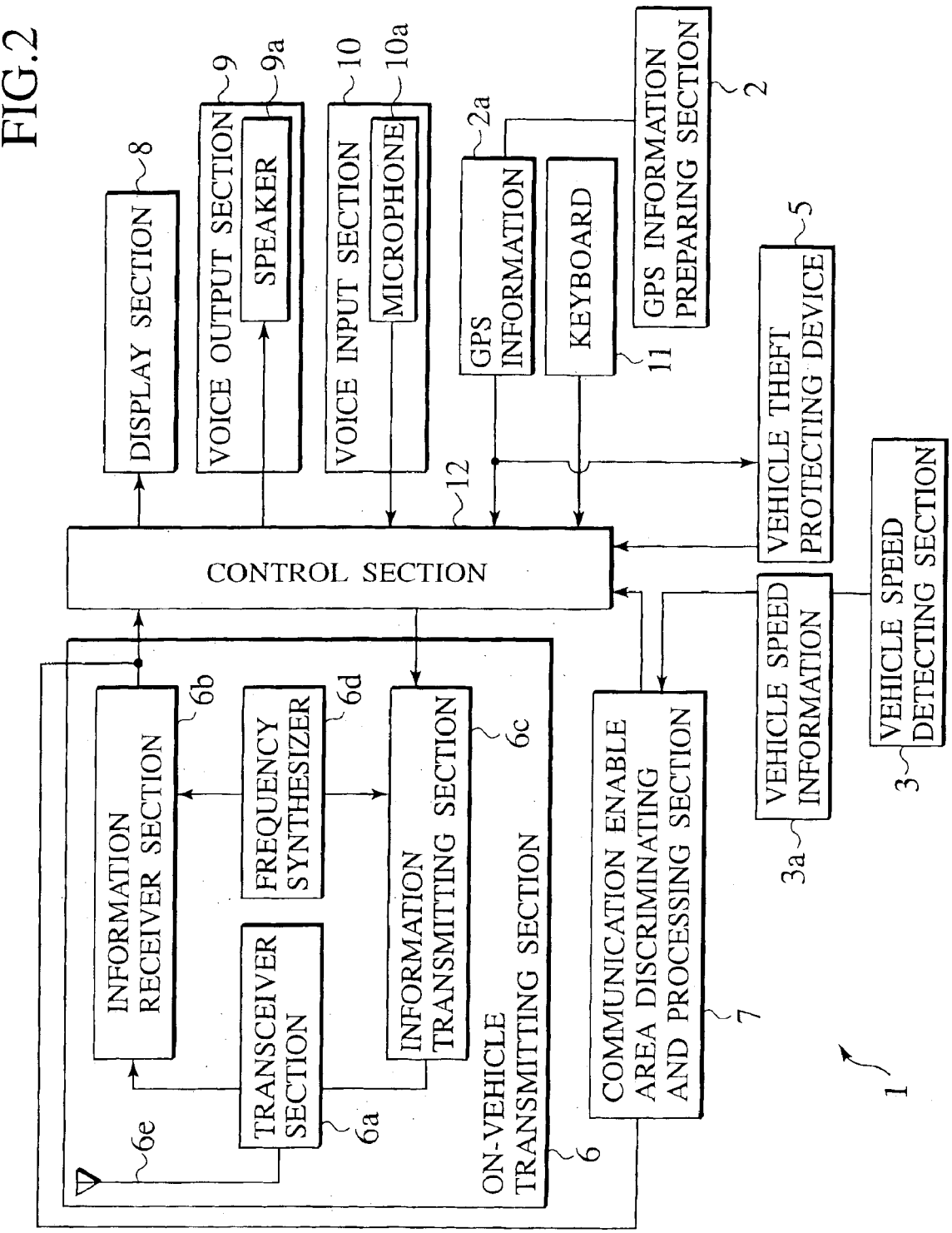
FIG. 2 is a block diagram illustrating a structure of a stolen vehicle tracking apparatus.
Figure 3:
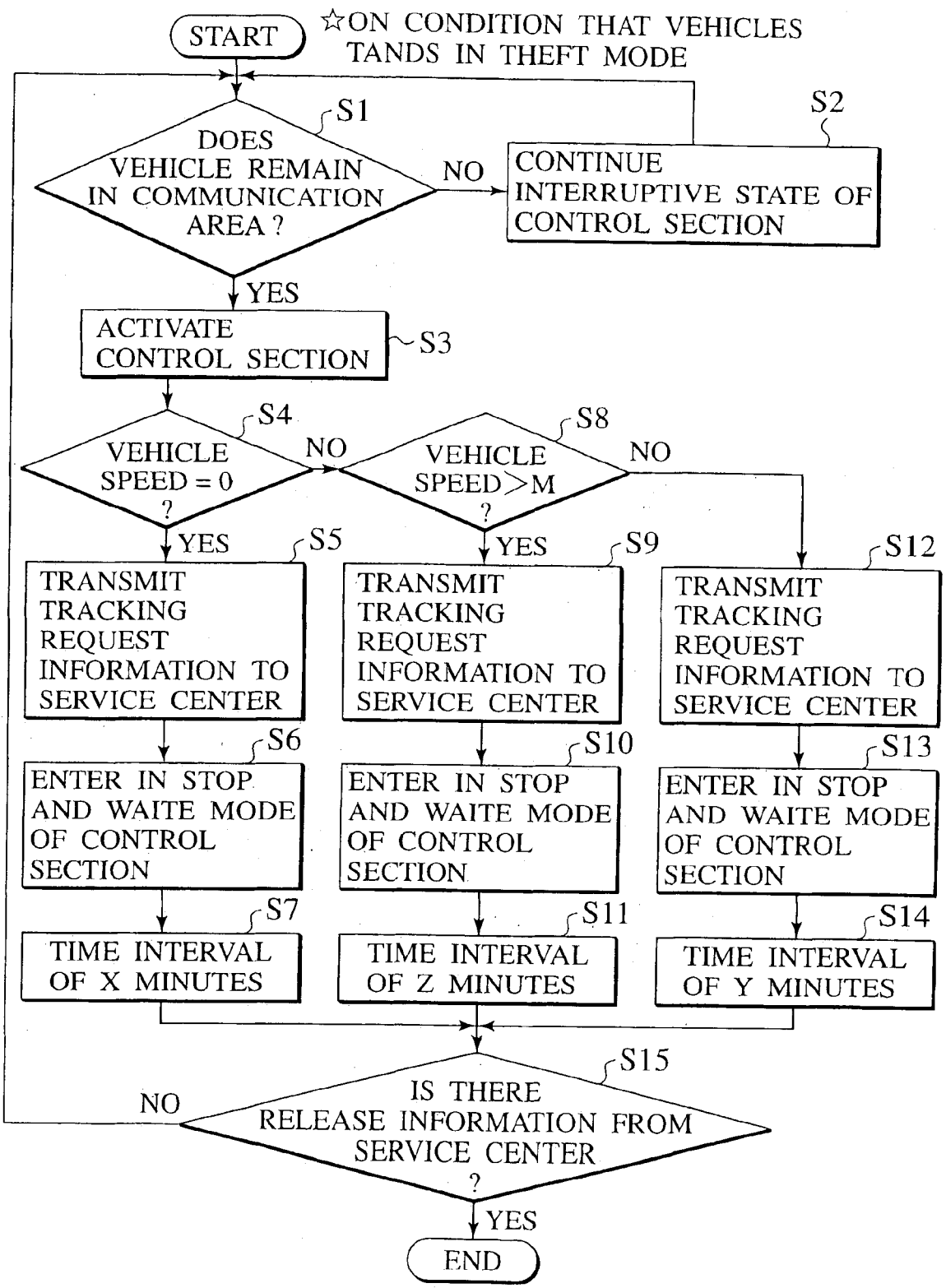
FIG. 3 is a flowchart illustrating a basic sequence of operations to be performed by the stolen vehicle tracking system shown in FIG. 1.

Now, a first embodiment according to the present invention is described with reference to FIGS. 1 to 3. FIG. 1 is a view illustrating a structure of a stolen vehicle tracking system 100. FIG. 2 is a block diagram illustrating a structure of a stolen vehicle tracking apparatus 1 and FIG. 3 is a flowchart illustrating an operational sequence to be executed by the stolen vehicle tracking apparatus 1.

According to the first embodiment, an own vehicle 102 shown in FIG. 1 is mounted with the stolen vehicle tracking apparatus 1 (see FIG. 2).

As shown in FIGS. 1 and 2, the stolen vehicle tracking system 100 is comprised of a GPS satellite 101, the own vehicle 102, a service center (base station) 103 and a public telephone network 104.

First, various component parts of the stolen vehicle tracking system 100 are described in connection with FIGS. 1 and 2.

The GPS satellite 101 serves to prepare GPS satellite information, related to a position of the GPS satellite 101, which is transmitted to the stolen vehicle tracking apparatus 1 shown in FIG. 2.

As shown in FIG. 2, the own vehicle 102 is comprised of the stolen vehicle tracking apparatus 1 and a GPS information preparing section 2, with these component parts being described below in detail.

The service center 103 shown in FIG. 1 transmits response request information, indicative of a request for a response from the own vehicle 102, to the public telephone network 104. Then, in an event that the response is transmitted from the own vehicle 102, given services are provided.

The public telephone network 104 intervenes between the own vehicle 102 and the service center 103 to enable bidirectional communication. In particular, information provided by the own vehicle 102 is transmitted to the service center 103, and information provided by the service center 103 is transmitted to the own vehicle 102.

Next, structures of the stolen vehicle tracking apparatus 1 and the GPR information preparing section 2 are described below in conjunction with FIG. 2.

As shown in FIG. 2, the stolen vehicle tracking apparatus 1 is comprised of a vehicle speed detecting section 3, a vehicle theft protecting device 5, an on-vehicle transmitting section (on-vehicle transmitting means) 6, a communication enable area discriminating and processing section (communication enable area discriminating and processing means) 7 and a control section (control means) 12.

Further, the stolen vehicle tracking apparatus 1 includes, as other component parts, a display section 8, a voice output section 9, a voice input section 10 and a keyboard 11.

Here, the GPS information preparing section 2, the vehicle theft protecting device 5, the on-vehicle transmitting section 6, the communication enable area discriminating and processing section 7 and the control section are installed on the own vehicle 102 in such a way disenabled to be discovered by and removed by an unauthorized person. This is because of the fact that since these component parts are principally used for the own vehicle 102 being stolen, there is a strict need for the associated component parts disenabled to be readily removed by the unauthorized person who tries to steal the own vehicle 102.

The GPS information satellite preparing section 2 acquires GPS satellite information, sent by the GPS satellite 101 shown in FIG. 1, using a GPS antenna, which is not shown, and measures a location of the own vehicle 102, i.e., the own vehicle location and current time in response to GPS satellite information.

Additionally, the GPS information satellite preparing section 2 prepares GPS information 2a, correlated with the measured result, which in turn is transmitted to the vehicle theft protecting device 5 and the control section 12.

The vehicle speed detecting section (vehicle speed detecting means) 3 detects a vehicle speed of the own vehicle 102 shown in FIG. 1 using a vehicle speed sensor and prepares vehicle speed information 3a.

The vehicle theft protecting device 5 is comprised of an immobilizer and transmits theft detecting information to the control section 12 when an ignition is started or the own vehicle 102 is moved with no verification made in a key cipher code.

Here, as a case in which the own vehicle 102 is moved with no verification made in the key cipher code, it is conceived that the own vehicle 102 happens to be transferred by a trailer.

Also, the vehicle theft protecting device 5 implements discrimination, responsive to GPS information 2a sent by the GPS information preparing section 2, to find if the own vehicle 102 is moved with no verification made in the key cipher code.

Further, the vehicle theft protecting device 5 has the other capability, than that described above, of outputting theft detecting information to the control section 12 during occurrence of a door of the own vehicle 102 being unintentionally opened.

The on-vehicle transmitting section 6 is comprised of a transceiver section 6a, an information receiver section 6b, an information transmitting section 6c and a frequency synthesizer 6d.

The transceiver section 6a includes a transceiver antenna 6e, which is used to acquire information sent from the public telephone network 104 shown in FIG. 1, with resulting information being outputted to the information receiver section 6b.

Furthermore, the on-vehicle transmitting section 6 transmits information delivered from the information transmitting section 6c to the public telephone network 104 using the transceiver antenna 6e.

After an allocated channel for relevant information has been acknowledged by the frequency synthesizer 6d, the information receiver section 6b outputs relevant information, sent from the transceiver section 6a which will be described below, to the communication enable area discriminating and processing section 7 and the control section 12.

After the allocated channel for relevant information has been acknowledged by the frequency synthesizer 6d whish will be described below, the information transmitting section 6c outputs information, sent from the control section 12, to the transceiver section 6a.

The frequency synthesizer 6d recognizes channels allocated for information which the control section 12 outputs to the information transmitting section 6c and information which the transceiver section 6a outputs to the information receiver section 6b.

The communication enable area discriminating and processing section 7 is responsive to information given by the information receiver section 6b to detect whether communication is being performed between the on-vehicle transmitting section 6 and the service center 103 (i.e., monitor a communication status), thereby discriminating to find if communication is available between the own vehicle 102 and the service center 103.

That is, when discriminated that communication has been implemented, the communication enable area discriminating and processing section 7 discriminates that communication is available (that is, the own vehicle 102 remains in a communication area of the service center 103).

Conversely, when discriminated that no communication has been implemented, the communication enable area discriminating and processing section 7 discriminates that communication is unavailable (that is, the own vehicle 102 remains in an area outside the communication area of the service center 103).

Here, the communication enable area discriminating and processing section 7 executes discrimination set forth above at all times as will be described later.

And, in an event that communication is found to be available with the service center 103, the communication enable area discriminating and processing section 7 outputs communication permit information, indicative of information being permitted to be transmitted to the service center 103, to the control section 12 every for given time intervals.

The display section 8 provides a display of image information given by the control section 12. The voice output section 9 includes a speaker 9a that outputs voice information given by the control section 12 by means of the speaker 9a.

The voice input section 10 includes a microphone 10a, with voice information 9 such as dial number information) inputted by the microphone 10a being outputted to the control section 12. The keyboard 11 prepares operational information, through input operations (such as input of dial number information) effectuated by an operator, which in turn is outputted to the control section 12.

The control section 12 is applied with theft detecting information from the vehicle theft protecting device 5 and operative only when communication permit information is delivered from the communication enable area discriminating and processing section 7, thereby performing the following control.

Namely, the control section 12 prepares tracking request information (in the form of given information), involving theft detecting information delivered from the vehicle theft protecting device 5 and GPS information delivered from the GPS information preparing section 2, which is outputted to the information transmitting section 6c.

Further, the control section 12 outputs information, delivered from the voice input section 10 and the keyboard 11, to the information transmitting section 6c.

Next, a basic sequence of operations, to be performed by the stolen vehicle tracking apparatus 1 in concurrence of the own vehicle 102 shown in FIG. 1 being stolen, is described with reference to FIGS. 1 to 3.

First, in an event that the own vehicle 102 shown in FIG. 1 is stolen, the vehicle theft protecting device 5 shown in FIG. 2 makes discrimination that the own vehicle 102 has been stolen and prepares theft detecting information.

Subsequently, the vehicle theft protecting device 5 outputs resulting theft detecting information to the control section 12.

In consecutive step S1 shown in FIG. 3, the communication enable area discriminating and processing section 7 discriminates to find if communication is available between the own vehicle 102 and the service center 103.

As a result, if the communication enable area discriminating and processing section 7 discriminates that relevant communication is unavailable (with "NO" in step S1), then in step S2 shown in FIG. 3, no communication permit information is outputted to the control section 12.

Thus, the communication enable area discriminating and processing section 7 maintains the control section 12 in its interruptive state.

Consequently, in step S2, since the control section 12 does not prepare tracking request information, the transceiver section 6a does not transmits relevant tracking request information to the service center 103.

In other word, the stolen vehicle tracking apparatus 1 controls so as to interrupt relevant tracking request information from being transmitted.

Conversely, in step S1 set forth above, if the communication enable area discriminating and processing section 7 discriminates that relevant communication is available, then in step S3, communication permit information is outputted to the control section 12.

Subsequently, the control section 12 is started up in response to communication permit information, sent from the communication enable area discriminating and processing section 7, and theft detecting information sent from the vehicle theft protecting device 5.

In succeeding step S4, the communication enable area discriminating and processing section 7 acquires vehicle information 3a from the vehicle speed detecting section 3 a number of given times (with the number of relevant given times being predetermined), and on the basis of resulting relevant vehicle information 3a, an average vehicle speed is calculated.

As a result, in case of the average vehicle speed laying at zero, that is when the own vehicle 102 remains halted, the stolen vehicle tracking apparatus 1 executes operations subsequent to step S5. On the contrary, if the vehicle speed does not fall in zero (with "NO" in step S4), the stolen vehicle tracking apparatus 1 executes operations subsequent to step S8. Therefore, first, the operations subsequent to step S5 are described.

That is, in step S5, the control section 12 prepares tracking request information and transmits the same to the information transmitting section 6c, and the frequency synthesizer 6d acknowledges the channel to be used for resulting relevant tracking request information.

Subsequently, the information transmitting section 6c outputs tracking request information, of which allocated channel is acknowledged, to the transceiver section 6a, which in turn transmits relevant tracking request information to the service center 103 through the public telephone network 104.

In step S6, the communication enable area discriminating and processing section 7 confirms that tracking request information has been transmitted from the transceiver 6a and, thereafter, interrupts communication permit information from being outputted. As a result of this interruption, the control section 12 is stopped.

In succeeding step S7, the communication enable area discriminating and processing section 7 continues to interrupt communication permit information from being outputted until an elapse of X minutes after the outputting of communication permit information has been stopped in step S6. As a result of this operation, the communication enable area discriminating and processing section 7 continues to interrupt operation of the controller 12 until an elapse of X minutes after the outputting of communication permit information has been stopped in step S6.

That is, the on-vehicle transmitting section 6 transmits tracking request information for a time interval of X minutes. In consecutive step S15, in the presence of release information being transmitted from the service center 103, tracking request information for the time interval of X minutes is interrupted from being transmitted. Here, examples wherein release information is transmitted include a case where the service center 103 grasps a current position of the stolen vehicle and discrimination is made that no further transmission of tracking request information is needed.

On the contrary, if the vehicle speed does not fall in zero, that is, when the own vehicle is being traveling, in operation of step S8, discrimination is made to find if the current vehicle speed is higher than a given vehicle speed M that is predetermined. Then, if the vehicle speed exceeds the given vehicle speed M, operations in step S9 to 11 are executed and conversely, if the vehicle speed is less than the given vehicle speed M, operations in step S12 to 14 are carried out.

If the vehicle speed is less than the given vehicle speed M, in step S12, the stolen vehicle tracking apparatus 1 executes the same operation as that of step S5 to prepare tracking request information, which in turn is transmitted to the service center 103 through the public telephone network 104.

In subsequent step S13, the communication enable area discriminating and processing section 7 executes the same operation as that of step S6, thereby interrupting the control section 12.

In consecutive step S14, the communication enable area discriminating and processing section 7 continues to interrupt communication permit information from being outputted until an elapse of Y minutes (for a longer time interval) after communication permit information has been interrupted from being outputted in step S13. As a result of this operation, the communication enable area discriminating and processing section 7 continues to interrupt operation of the control section 12 until an elapse of Y minutes after communication permit information has been stopped from being outputted in step S10.

That is, the on-vehicle transmitting section 6 transmits tracking request information for a time interval of Y minutes. In next step S15, if the service center 103 transmits release information, transmission of tracking request information for the time interval of Y minutes is interrupted.

Here, a length of Y minutes is determined to be shorter than the X minutes. That is, the relationship of X minutes>Y minutes is established.

Conversely, in step S8 set forth above, if the average speed is greater than the given speed M, then in step S9, the stolen vehicle tracking apparatus 1 executes the same operation as that of step S5 such that tracking request information is transmitted to the service center 103 through the public telephone network 104.

Next, in step S10, the communication enable area discriminating and processing section 7 executes the same operation as that of step S6, thereby interrupting the control section 12.

In subsequent step S11, the communication enable area discriminating and processing section 7 continues to interrupt communication permit information from being outputted until an elapse of Z minutes (for a shorter time interval) after the outputting of communication permit information has been stopped in step S10.

That is, the on-vehicle transmitting section 6 transmits tracking request information for a time interval X minutes. In step S15, in the presence of release information being transmitted from the service center 103, tracking request information for the time interval of Z minutes is interrupted from being transmitted.

Here, a length of Z minutes is determined to be shorter than the Y minutes. That is, the relationship X minutes>Y minutes>Z minutes is established.

Also, in the absence of, in step S15 set forth above, release information transmitted from the service center 103 (with "NO" in step S15), the stolen vehicle tracking apparatus 1 repeatedly executes the operations subsequent to step S1.

As apparent from the above description, in the first embodiment, when discriminated that the communication enable area discriminating and processing section 7 is unable to establish communication, the stolen vehicle tracking apparatus 1 stops the control section 12.

As such, the control section 12 becomes inoperative to interrupt tracking request information from being outputted to the on-vehicle transmitting section 6.

Stated another way, when discriminated that the communication enable area discriminating and processing section 7 is unable to establish communication, the control section 12 controls so as to interrupt tracking request information from being transmitted.

Thus, the stolen vehicle tracking apparatus 1 is able to prevent electric power, required for transmitting tracking request information, from being consumed without causing an obstacle in tracking the own vehicle 102. Namely, the stolen vehicle tracking apparatus 1 is enabled to restrict electric power consumption.

Further, the stolen vehicle tracking apparatus 1 is operative to monitor the communicative status for given time intervals (in step S2) even under a transmission interruptive condition while enabling tracking request information to be transmitted in occurrence of a communicative consequence (with "YES" in step S1).

Accordingly, if after the own vehicle 102 travels outside of the communication area of the service center 103, the own vehicle 102 enters the communication area of the service center 103, the stolen vehicle tracking apparatus 1 is enabled to resume transmitting tracking request information.

Here, since the stolen vehicle tracking apparatus 1 performs the above-described monitoring at all times, if after the own vehicle 102 travels outside of the communication area of the service center 103, the own vehicle 102 enters the communication area of the service center 103, the stolen vehicle tracking apparatus 1 is enabled to promptly resume transmitting tracking request information.

Also, the stolen vehicle tracking apparatus 1 is operative to alter the time intervals for which tracking request information is transmitted and modify the relevant time intervals in dependence on the average vehicle speed.

As a result, the stolen vehicle tracking apparatus 1 is able to restrict the electric power consumption. Also, it becomes possible for the stolen vehicle tracking apparatus 1 to alter the relevant time interval so as to enable the service center 103 to accurately grasp a varying location of the own vehicle 102 even in occurrence of variation in the average vehicle speed.

More particularly, in an event that the average vehicle speed is higher than the given vehicle speed M, the stolen vehicle tracking apparatus 1 controls such that tracking request information is transmitted each for Z minutes (for the shorter time interval).

Accordingly, even in the occurrence of the average vehicle speed exceeding the given vehicle speed M, the relevant time interval can be altered so as to enable the service center 103 to accurately grasp the varying location of the own vehicle 102.

Conversely, in an event that the average vehicle speed is less than the given vehicle speed M, the stolen vehicle tracking apparatus 1 controls such that tracking request information is transmitted each for Y minutes (for longer time interval).

As a consequence, in the occurrence of the average vehicle speed decreasing below the given vehicle speed M, the stolen vehicle tracking apparatus 1 enables the electric power consumption to be decreased to a lower value than that occurring when the average vehicle speed is higher than the given vehicle speed M.

Also, in such case, since the average vehicle speed is less than the given vehicle speed M, the service center 103 is enabled to accurately grasp the varying location of the own vehicle 102.

Additionally, in the occurrence of the average vehicle speed laying in zero, the stolen vehicle tracking apparatus 1 controls such that tracking request information is transmitted each for X minutes (for longer time interval than Y minutes).

As a result, the electric power consumption of the stolen vehicle tracking apparatus 1 is decreased to a lower value than that occurring when the average vehicle speed does not fall in zero.

Also, in such case, since the average vehicle speed is less than the given vehicle speed M, the service center 103 is enabled to accurately grasp the varying location of the own vehicle 102.

Further, the stolen vehicle tracking apparatus 1 acquires vehicle speed information from the vehicle speed detecting section 3 a given number of times and calculates the average vehicle speed on the basis of resulting relevant vehicle speed information 3a.

Consequently, the stolen vehicle tracking apparatus 1 is able to calculate the average vehicle speed responsive to the vehicle speed detected by the vehicle speed detecting section 3, that is, an accurate speed. In addition, it is possible for the above-described time interval to be altered depending on the relevant vehicle speed, that is, an average behavior of the own vehicle 102.

As a result, the stolen vehicle tracking apparatus 1 has a capability of preventing the above-described time interval from being set to the X minutes during the occurrence where the own vehicle 102 stands halted by chance at a certain time instant and happens to travel at a time instant other than the preceding time instant.

(Second Embodiment)

Now, a second embodiment of the present invention is explained with reference to FIGS. 1 to 3.

The stolen vehicle tracking system of the second embodiment is identical in structure to the stolen vehicle tracking system 100 except for that the sequence of measuring (detecting) the vehicle speed, to be performed by the vehicle speed detecting section 3, and the sequence of measuring the vehicle speed of the own vehicle 102 to be performed by the communication enable area discriminating and processing section 7 are different from those of the stolen vehicle tracking system 100.

Therefore, various component parts of the stolen vehicle tracking system of the second embodiment are described only in conjunction with the component parts that are different from those of the stolen vehicle tracking system 100. Also, relevant like component parts bear the same reference numerals as those of the stolen vehicle tracking system 100.

The vehicle speed detecting section 3 of the second embodiment acquires GPS information 2a from the GPS information preparing section 2 a given number of times (with such number of times being predetermined to be more than two times).

Then, the vehicle speed detecting section 3 is responsive to resulting relevant GPS information 2a to calculate the amount of displacement of the own vehicle per unit time, thereby measuring an average vehicle speed in response to the amount of displacement that has been calculated.

The communication enable area discriminating and processing section 7 uses such a resulting average vehicle speed as the average vehicle speed of the own vehicle 102.

With the structure as set forth above, the second embodiment is able to have the same advantageous effect as that of the first embodiment and, in addition thereto, has the following advantageous effects.

That is, the communication enable area discriminating and processing section 7 is able to alter the time interval, for which tracking request information is to be transmitted, in dependence on the average vehicle speed, that is, the average behavior of the own vehicle 102.

As a result, the stolen vehicle tracking apparatus 1 has a capability of preventing the above-described time interval from being set to the X minutes during the occurrence where the own vehicle 102 stands halted by chance at a certain time instant and happens to travel at a time instant other than such a time instant.

Also, in the first and second embodiments set forth above, while the present invention has been set forth with reference to an example where the communication enable area discriminating and processing section 7 executes discrimination to find if communication is available between the own vehicle and the service center 103 at all times, it may be altered such that discrimination is performed every for given time intervals. In such case, advantageous effect is resulted from a concept of the invention defined in claim 2.

The entire content of Japanese Patent Application No. P2002-204330 with a filing date of Jul. 12, 2002 is herein incorporated by reference.

Although the present invention has been described above by reference to certain embodiments of the invention, the invention is not limited to the embodiments described above and modifications will occur to those skilled in the art, in light of the teachings. The scope of the invention is defined with reference to the following claims.

What is claimed is:

1. A stolen vehicle tracking apparatus comprising:
   an on-vehicle transmitter transmitting given information to a base station in occurrence of an own vehicle being stolen;
   a communication enable area discriminator discriminating to find whether communication is available between the own vehicle and the base station;
   a controller controlling the on-vehicle transmitter so as to interrupt the given information from being transmitted when discriminated by the communication enable area discriminator that the own vehicle stands outside of a communication area; and
   a speed detector detecting an own vehicle speed,
   wherein when discriminated that communication is made available between the own vehicle and the base station, the communication enable area discriminator alters a time interval, for which the given information is transmitted, in dependence on the own vehicle speed detected by the speed detector.

2. The stolen vehicle tracking apparatus according to claim 1, wherein
   the communication enable area discriminator monitors a communication status every for given time intervals even in a transmission interruptive state; and
   the controller transmits the given information to the base station when communication is made available.

3. The stolen vehicle tracking apparatus according to claim 1, wherein
   the communication enable area discriminator sets the time interval, for which the given information is transmitted, to be a shortened time interval in occurrence of the own vehicle speed exceeding a given speed.

4. The stolen vehicle tracking apparatus according to claim 1, wherein
   the communication enable area discriminator sets the time interval, for which the given information is transmitted, to be an extended time interval in occurrence of the own vehicle speed falling to be less than a given speed.

5. The stolen vehicle tracking apparatus according to claim 1, wherein
   the speed detector measures the own vehicle speed depending on the amount of displacement of an own vehicle location per unit time.

6. A stolen vehicle tracking apparatus comprising:
   on-vehicle transmitting means for transmitting given information to a base station in occurrence of an own vehicle being stolen;
   communication enable area discriminating and processing means for discriminating to find whether communication is available between the own vehicle and the base station;
   control means controlling the on-vehicle transmitting means so as to interrupt the given information from being transmitted when discriminated by the communication enable area discriminating and processing means that the own vehicle stands outside of a communication area; and
   speed detecting means for detecting an own vehicle speed,
   wherein when discriminated that communication is made available between the own vehicle and the base station, the communication enable area discriminating means alters a time interval, for which the given information is transmitted, in dependence on the own vehicle speed detected by the speed detecting means.

7. A method of tracking a stolen vehicle in occurrence of an own vehicle being stolen, the method comprising;
   transmitting given information to a base station in occurrence of an own vehicle being stolen:
   discriminating whether communication is available between an own vehicle and the base station;
   interrupting the given information being transmitted when discriminated that the own vehicle stands outside of a communication area; and
   altering a time interval, for which the given information is transmitted, in dependence on a speed of the own vehicle when discriminated that communication is made available between the own vehicle and the base station.

* * * * *